(12) United States Patent
Seidenberger et al.

(10) Patent No.: US 8,973,945 B2
(45) Date of Patent: Mar. 10, 2015

(54) RETENTION HARNESS

(71) Applicants: Peter Seidenberger, Great Mills, MD (US); William Reason, Lexington Park, MD (US); Zachariah Thull, Lexington Park, MD (US); Patrick Dillon, Miami, FL (US)

(72) Inventors: Peter Seidenberger, Great Mills, MD (US); William Reason, Lexington Park, MD (US); Zachariah Thull, Lexington Park, MD (US); Patrick Dillon, Miami, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 156 days.

(21) Appl. No.: 13/897,800

(22) Filed: May 20, 2013

(65) Prior Publication Data
US 2014/0339801 A1 Nov. 20, 2014

(51) Int. Cl.
| | |
|---|---|
| *B60R 22/00* | (2006.01) |
| *A62B 35/00* | (2006.01) |
| *B60R 22/12* | (2006.01) |
| *B60R 22/18* | (2006.01) |

(52) U.S. Cl.
CPC .............. *B60R 22/12* (2013.01); *B60R 22/18* (2013.01)
USPC ........ 280/808; 280/801.1; 297/485; 297/484; 297/467; 297/464

(58) Field of Classification Search
CPC ................................ B60R 22/12; B60R 22/18
USPC ........ 280/808, 801.1; 297/485, 484, 467, 464
See application file for complete search history.

(56) References Cited

U.S. PATENT DOCUMENTS

| | | | | |
|---|---|---|---|---|
| 4,145,074 | A * | 3/1979 | Hendricks | 280/808 |
| 5,544,363 | A * | 8/1996 | McCue et al. | 2/102 |
| 6,820,902 | B2 * | 11/2004 | Kim | 280/808 |
| 6,902,193 | B2 * | 6/2005 | Kim et al. | 280/801.1 |
| 7,341,025 | B1 * | 3/2008 | Streeter et al. | 119/857 |
| 7,481,399 | B2 * | 1/2009 | Nohren et al. | 244/122 R |
| 7,905,553 | B2 * | 3/2011 | Lichtner | 297/465 |
| 8,336,503 | B2 * | 12/2012 | Spinelli | 119/770 |

* cited by examiner

*Primary Examiner* — Paul N Dickson
*Assistant Examiner* — Joselynn Y Sliteris
(74) *Attorney, Agent, or Firm* — Mark O. Glut; Nawcad

(57) ABSTRACT

A retention harness for restraining a user within a vehicle. The harness includes a waist strap, a waist strap buckle assembly, two over the shoulder straps, a rear connector, and a forward connector. The waist strap is attachable to the waist strap buckle assembly. Each over the shoulder strap is attached to the waist strap buckle assembly. The two over the shoulder straps form an X on a user's back via a shoulder strap crossover plate, while each over the shoulder strap is adjustable via an adjustment slider. The rear connector is attached to the waist strap, and is attachable to retention hardware. The retention hardware is attachable to a bar attached to the vehicle. The forward connector is attached to the waist strap buckle assembly and attachable to forward retention hardware, the forward retention hardware attachable to the vehicle.

1 Claim, 4 Drawing Sheets

RETENTION HARNESS

STATEMENT OF GOVERNMENT INTEREST

The invention described herein may be manufactured and used by or for the Government of the United States of America for governmental purposes without payment of any royalties thereon or therefor.

BACKGROUND

Various military vehicles such as trucks, boats, and aircraft produce high energy movement in multiple unpredictable directions. This movement may cause a person in the vehicle to become injured and/or fall out of the vehicle. Currently used harnesses in these types of high impact vehicles do not have the ability to adequately secure a user within the vehicle.

For example, but without limitation, the Deployable Operations Group of the United States Coast Guard (USCG) utilizes small craft with machine guns mounted on the bow. Currently the USCG uses a rudimentary repelling harness and a single forward mounted strap to secure a gunner in the boat. This configuration has led to numerous individuals being ejected from the craft in high seas and during aggressive maneuvering.

SUMMARY

The present invention is directed to a retention harness that meets the needs enumerated above and below.

The present invention is directed to a retention harness for restraining a user within a vehicle. The assembly includes a waist strap, a waist strap buckle assembly, two over the shoulder straps, a rear connector, and a forward connector. The waist strap has a first waist strap end, a second waist strap end, and a middle portion. The middle portion is disposed between the first waist strap end and the second waist strap end. The first waist strap end and the second waist strap end are attachable to the waist strap buckle assembly. Each over the shoulder strap has a first strap end and a second strap end, and each first strap end is attached to the waist strap buckle assembly. Each second strap end is attached to the middle portion. The two over the shoulder straps form an X on a user's back via a shoulder strap crossover plate, while each over the shoulder strap is adjustable via an adjustment slider. The rear connector is attached to the middle portion of the waist strap, and is attachable to rear retention hardware. The rear retention hardware is attachable to a bar attached to the vehicle. The forward connector is attached to the waist strap buckle assembly and attachable to forward retention hardware, the forward retention hardware attachable to the vehicle.

It is a feature of the present invention to provide a retention harness that can adequately secure a user without modification to the vehicle.

It is a feature of the present invention to provide a retention harness that prevents a user from being ejected from a high impact vehicle.

DRAWINGS

These and other features, aspects, and advantages of the present invention will become better understood with reference to the following description and appended claims, and accompanying drawings wherein:

DESCRIPTION

Figure 1:
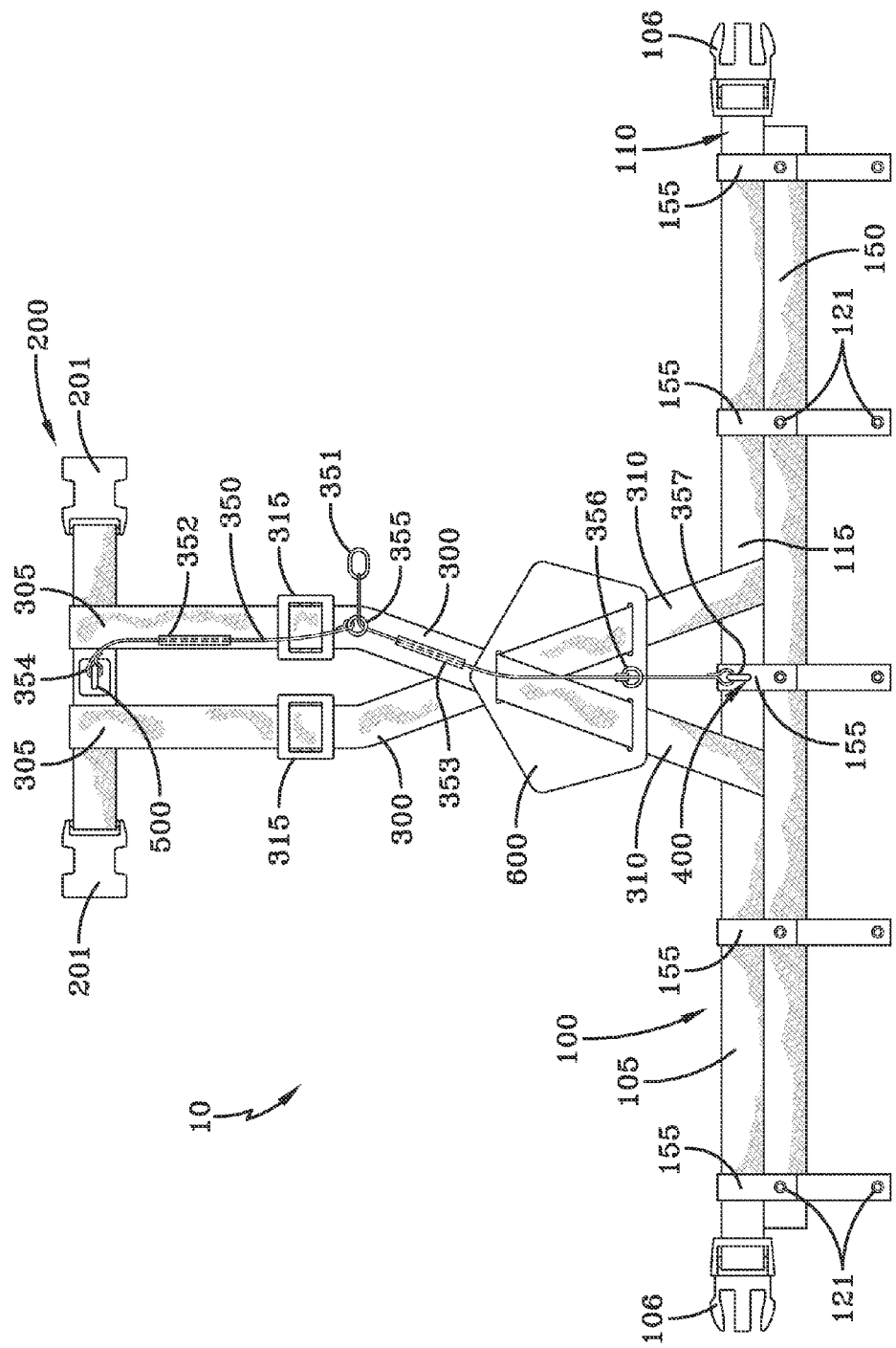
FIG. 1 is a top of an embodiment of the retention harness in the unbuckled position.

The preferred embodiments of the present invention are illustrated by way of example below and in FIGS. 1-7. As shown in FIG. 1, a retention harness 10 for restraining a user within a vehicle includes a waist strap 100, a waist strap buckle assembly 200, two over the shoulder straps 300, a rear connector 400, and a forward connector 500. The waist strap 100 has a first waist strap end 105, a second waist strap end 110, and a middle portion 115. The middle portion 115 is disposed between the first waist strap end 105 and the second waist strap end 110. The first waist strap end 105 and the second waist strap end 110 are attachable to the waist strap buckle assembly 200. Each over the shoulder strap 300 has a first strap end 305 and a second strap end 310, and each first strap end 305 is attached to the waist strap buckle assembly 200. Each second strap end 310 is attached to the middle portion 115 of the waist strap 100. The two over the shoulder straps 300 form an X on a user's back via a shoulder strap crossover plate 600, and each over the shoulder strap 300 is adjustable via an adjustment slider 315. The rear connector 400 is attached to the middle portion 115 of the waist strap 100, and is attachable to retention hardware 700 (shown in FIG. 2), particularly rear retention hardware. The retention hardware 700 is attachable to a fixed point on a vehicle. It may be attached via a bar, strap, any combination thereof, or any other means practicable such that it will allow a crewmember limited movement. The forward connector 500 is attached to the waist strap buckle assembly 200, and is attachable to a solid forward mount on the vehicle.

In the description of the present invention, the invention will be discussed in a military environment; however, this invention can be utilized for any type of application that requires use of a retention harness 10.

As shown in FIG. 1, the retention harness 10 may also include a padded waist belt 150. The padded waist belt 150 may be attached via stitching or attachable to the waist strap 100 via guide loops 155. In the preferred embodiment, the guide loops 155 are part of the padded waist belt 150.

Figure 2:
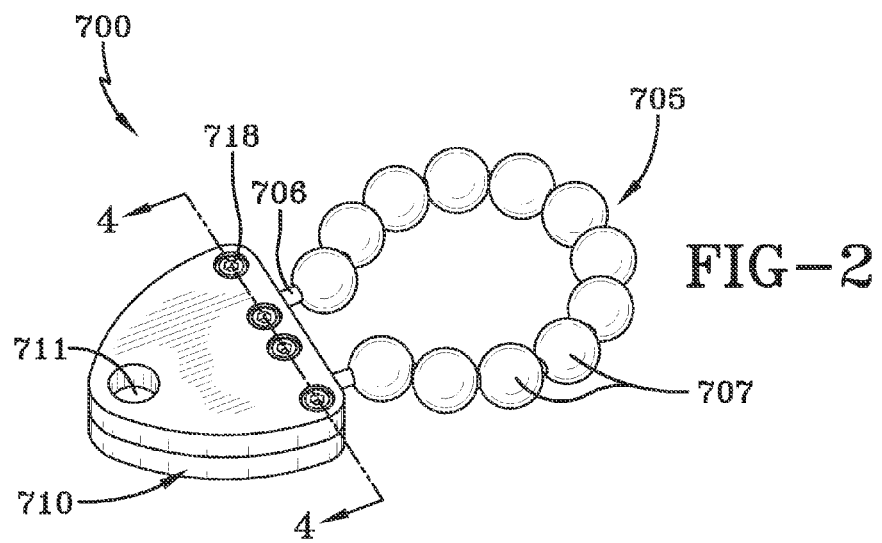
FIG. 2 is a top perspective view of an embodiment of the retention hardware.
Figure 3:
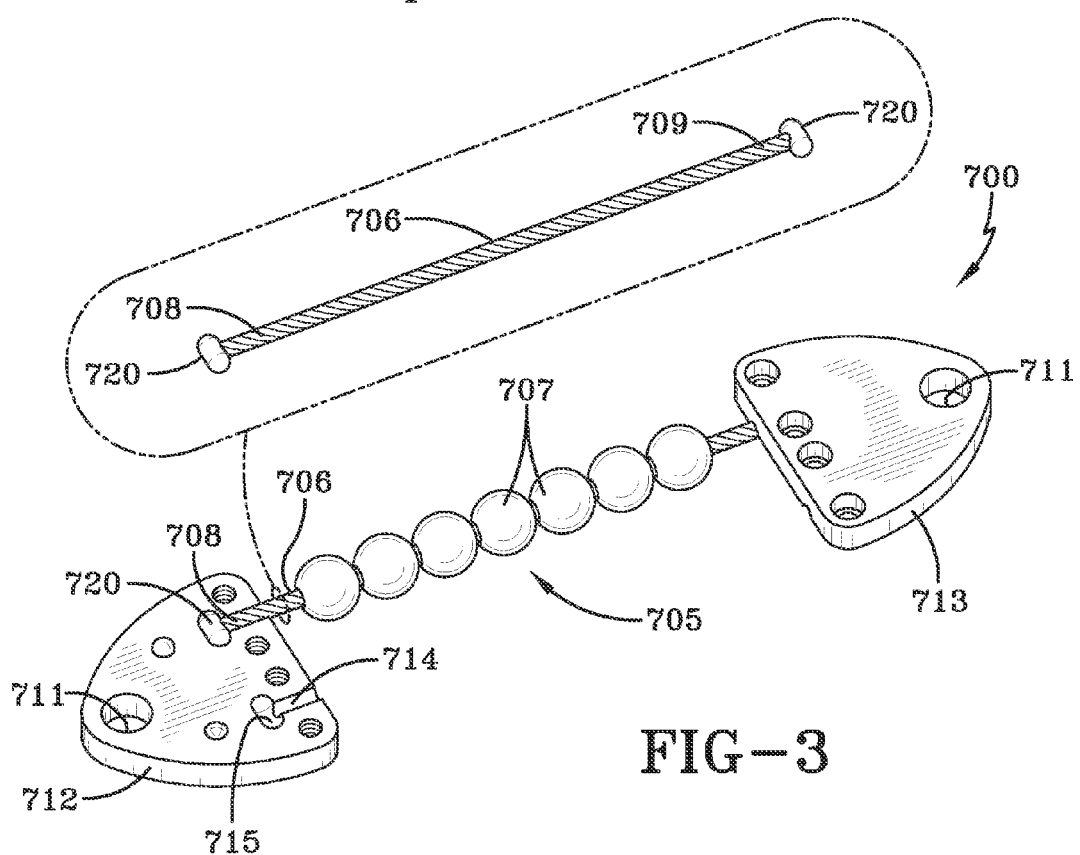
FIG. 3 is a top perspective view of an embodiment of the retention hardware with the attachment block portions unfastened.

The retention hardware 700, may be any type of connector such as a rolling connector, a quick disconnect, or any other apparatus that can operate as retention hardware or as a connector. In one of the embodiments, as shown in FIG. 2, the retention hardware 700 includes a looped portion 705 and an attachment block 710. As shown in FIGS. 2 and 3, the looped portion 705 is a cable 706 threaded with beads 707 and is able to be attached to a fixed point on the vehicle. In one of the embodiments, the looped portion 705 is able to surround a bar on the vehicle such that the user can move laterally along the axis of the bar. The cable 706 may be, but without limitation, manufactured from stainless steel, metal, metal alloys, ceramics, or any type of material practicable. The beads 707 may be, but without limitation, manufactured from nylon, or any type of material practicable. Preferably the beads 707 are manufactured from any non-corrosive and non-wearing material. The looped portion 705 is attached to the attachment block 710, and the attachment block 710 has an aperture 711 that can be used to connect the retention hardware 700 to the rear connector 400 or forward connector 500 via a retention strap.

Figure 4:
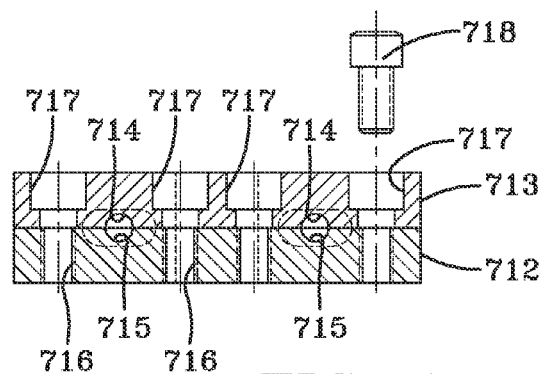
FIG. 4 is a cross sectional view of an embodiment of the retention hardware.

As shown in FIGS. 2 and 3, the cable 706 of the looped portion 705 of the retention hardware 700 has a first cable end 708 and a second cable end 709. The first cable end 708 and the second cable end 709 are disposed on opposite ends of the cable 706. As shown in FIGS. 2 and 3, both the first cable end 708 and the second cable end 709 are attached to the attachment block 710 such that they form the looped portion 705 in the shape of a "U." As shown in FIG. 3, at both the first cable end 708 and the second cable end 709 there is a ball swedge 720. The attachment block 710 may include a first attachment block portion 712 and a second attachment block portion 713. The first attachment block portion 712 and the second attachment block portion 713 may be substantially similar. Both may include two ball swedge-cable impressions 714. Each ball swedge-cable impression 714 may correspond to a ball swedge-cable impression 714 on the other attachment block portion 712, 713 such that when the first attachment block portion 712 and the second attachment block portion 713 are placed together, a ball swedge-cable passageway 715 is created by the corresponding ball swedge-cable impressions 714. The ball swedge-cable passageway 715 accepts and holds the ball swedge 720 and a portion of the cable 706 (particularly part of the first cable end 708 or second cable end 709). Each attachment block portion 712, 713 may include attachment passageways 716 and corresponding counter sinks 717. As shown in FIG. 4, the first attachment block portion 712 and the second attachment block portion 713 are fastened via fasteners 718 disposed within the attachment passageways 716 and corresponding counter sinks 717. The fasteners may be screws, bolts, or any type of fastener practicable.

As shown in FIG. 1, the retention harness 10 may also include a shackle release lanyard 350 and a release lanyard toggle 351. The shackle release lanyard 350 is routed through guide tubes 352, 353 and guide rings 354, 355, 356, 357, and is actuated manually by the user with the release lanyard toggle 351. The shackle release lanyard 350 may be disposed on and/or in one of the over the shoulder straps 300. The rear connector 400 and the forward connector 500 have a locked and unlocked position, such that when locked the connectors 400, 500 are attached to a vehicle or retaining straps that can attach to the vehicle. In the preferred embodiment, the rear connector 400 and forward connector 500 have a claw-snap configuration. The shackle release lanyard 350 communicates with the rear connector 400 and the forward connector 500 such when the shackle release lanyard 350 is actuated both the rear connector 400 and the forward connector 500 are unlocked, thereby, releasing the retention harness 10 from the vehicle and/or any retaining straps attached to the vehicle. The release lanyard toggle 351 communicates with the shackle release lanyard 350 such that when the release lanyard toggle 351 is pulled by the user, the shackle release lanyard 350 causes the rear connector 400 and the forward connector 500 to unlock.

The waist strap 100 and two over the shoulder straps 300 may be, but without limitation, manufactured from any fabric practicable. In one of the embodiments of the invention, the waist strap 100 may be manufactured from acrylic nylon.

Figure 5:
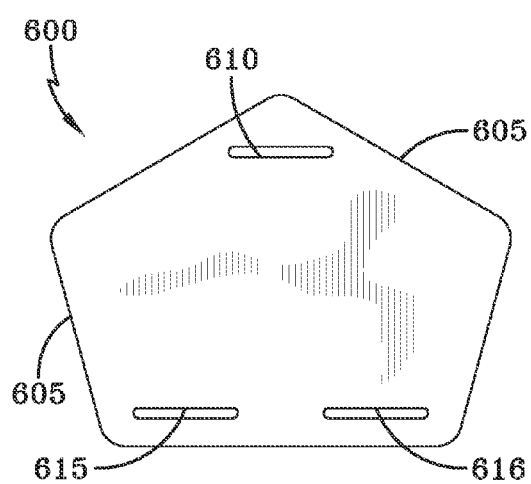
FIG. 5 is a top view of an embodiment of the shoulder strap crossover plate.

In the preferred embodiment, as shown FIG. 5 the shoulder strap crossover plate 600 is pentagon shaped. It has five edge strip portions 605 outlining the shape of a pentagon. The shoulder strap crossover plate 600 further includes a first slot 610, a second slot 615, and a third slot 616. The shoulder straps 300 enter the first slot 610, cross over one another, and then separately go through the second slot 615 and the third slot 616.

Figure 6:
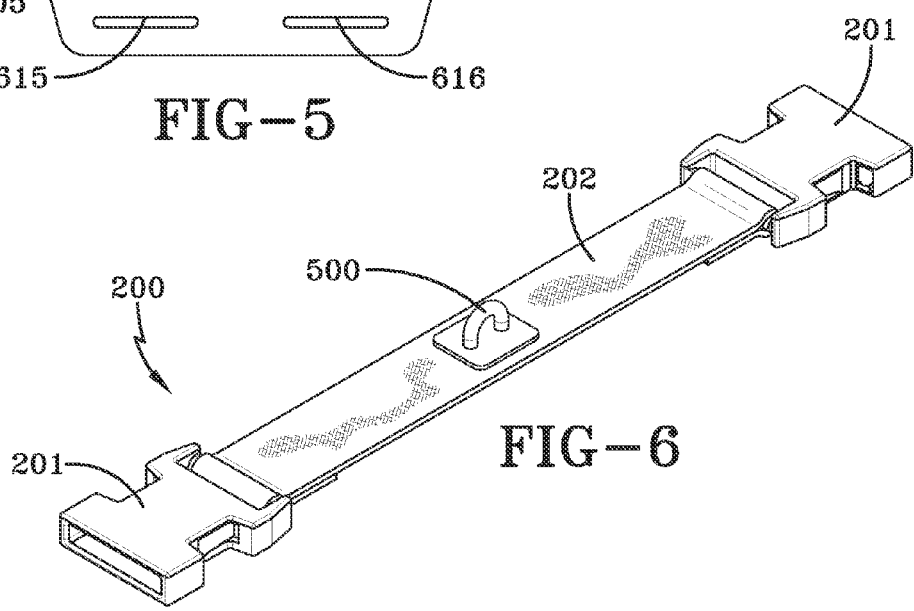
FIG. 6 is a top perspective view of an embodiment of the waist strap buckle assembly; and, FIG. 7 is a side view of an embodiment of the utility belt.

In one of the embodiments of the indention, as shown in FIG. 6, the waist strap buckle assembly 200 has two female quick disconnect fittings 201 and a connecting strap 202. The female quick disconnect fittings 201 are disposed at opposite ends of the connecting strap 202. These female quick disconnect fittings 201 correspond to male quick disconnect fittings 106 disposed at both the first waist strap end 105 and the second waist strap end 110 of the waist strap 100.

Figure 7:
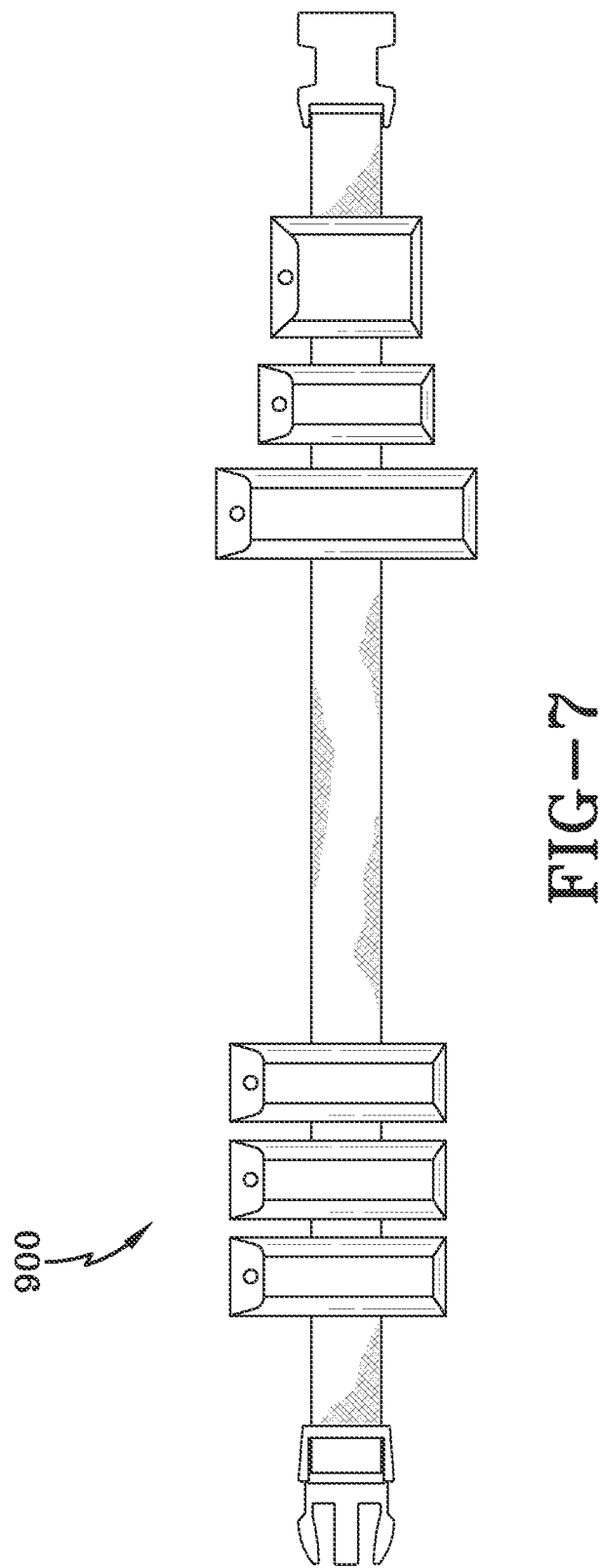

The retention harness 10 may be designed such that a standard issue utility belt 900 may be incorporated into the retention harness 10. As shown in FIG. 7, the padded waist belt 150 may be equipped with five harness waist belt/utility belt keepers, which can be used to attach a standard utility belt 900 to the retention harness 10. In one of the embodiments, the guide loops 155 may be a strap-snap system 121 such that the utility belt 900 may be easily attached and detached from the patted waist belt 150.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A retention harness for restraining a user within a vehicle, the harness comprising of:
   a waist strap, the waist strap having a first waist strap end, a second waist strap end, a middle portion, the middle portion disposed between the first waist strap end and the second waist strap end;
   a waist strap buckle assembly, the first waist strap end and the second waist strap end attachable to the waist strap buckle assembly;
   two over the shoulder straps, each over the shoulder strap having a first strap end and a second strap end, each first strap end attached to the waist strap buckle assembly, each second strap end attached to the middle portion, the two over the shoulder straps forming an X on a user's back via a shoulder strap crossover plate, each shoulder strap adjustable via an adjustment slider;
   a rear connector attached to the middle portion of the waist strap, the rear connector attachable to rear retention hardware, the rear retention hardware attachable to the vehicle;
   a forward connector attached to the waist strap buckle assembly, the forward connector attachable to forward retention hardware, the forward retention hardware attachable to the vehicle, the rear and forward retention hardware both comprising of a looped portion and an attachment block, the looped portion being a cable threaded with beads and able to be attached and to surround a bar on the vehicle, the looped portion attached to the attachment block, the attachment block having an aperture for attachment to the retention harness.

* * * * *